United States Patent
Song et al.

(10) Patent No.: US 8,336,840 B2
(45) Date of Patent: Dec. 25, 2012

(54) BRAKING DEVICE FOR BRAKING A SUPPORT MEMBER AND SUPPORTING DEVICE FOR SUPPORTING THE SUPPORT MEMBER WITH THE SAME

(75) Inventors: Jung Sik Song, Seoul (KR); Dong Jun Oh, Seoul (KR); Ghi Young Kim, Seoul (KR)

(73) Assignee: Medison Co., Ltd., Kangwon-Do (KR)

( * ) Notice: Subject to any disclaimer, the term of this patent is extended or adjusted under 35 U.S.C. 154(b) by 474 days.

(21) Appl. No.: 12/620,816

(22) Filed: Nov. 18, 2009

(65) Prior Publication Data
US 2010/0123057 A1    May 20, 2010

(30) Foreign Application Priority Data

Nov. 18, 2008  (KR) .................. 10-2008-0114525
Oct. 28, 2009  (KR) .................. 10-2009-0102886

(51) Int. Cl.
*E04G 3/00* (2006.01)
(52) U.S. Cl. ............. 248/284.1; 248/286.1; 248/280.11; 248/281.11; 108/6; 108/7; 108/8; 108/138; 108/140
(58) Field of Classification Search ............. 248/188.2, 248/284.1, 286.1, 278.1, 280.11, 281.11, 248/118, 918; 108/138, 140, 93, 6, 7, 8; 600/459
See application file for complete search history.

(56) References Cited

U.S. PATENT DOCUMENTS

| 5,129,397 | A  | * | 7/1992 | Jingu et al. ............... 600/437 |
| 6,135,404 | A  | * | 10/2000 | Wisniewski et al. ..... 248/281.11 |
| 6,186,460 | B1 | * | 2/2001 | Lin .......................... 248/284.1 |
| 6,199,809 | B1 | * | 3/2001 | Hung ....................... 248/284.1 |
| 6,270,047 | B1 | * | 8/2001 | Hudson .................... 248/286.1 |
| 6,279,859 | B2 | * | 8/2001 | West et al. ................ 248/118 |
| 6,533,229 | B1 | * | 3/2003 | Hung ....................... 248/286.1 |
| 6,663,569 | B1 |   | 12/2003 | Wilkins et al. |
| 6,929,228 | B2 | * | 8/2005 | Whitaker et al. ......... 248/284.1 |
| 2004/0262477 | A1 |   | 12/2004 | Whitaker et al. |
| 2006/0157628 | A1 |   | 7/2006 | Mileos et al. |

OTHER PUBLICATIONS

Extended European Search Report issued in European Patent Application No. 09175237.8, dated Oct. 7, 2011.

* cited by examiner

*Primary Examiner* — Ramon Ramirez
*Assistant Examiner* — Todd M Epps
(74) *Attorney, Agent, or Firm* — McDermott Will & Emery LLP (57) ABSTRACT

There is provided a braking device for braking a support member, which connects a main body of an equipment at one end thereof and a sub-body of the equipment at an opposite end thereof. Such a device includes a support bracket, a shaft, first and second plates, a pressing member, and a movable member. The support bracket is mounted on the main body of the equipment. The shaft is connected at both ends on the main body of the equipment. The first plates are disposed around the shaft and movable relative to the shaft. The second plates are disposed around the shaft and alternately positioned between the first plates. The pressing member presses the first and second plates in a braked position. The first and second plates are spaced apart from one another in an unbraked position. The movable member moves the pressing member between the braked and unbraked positions.

14 Claims, 8 Drawing Sheets

BRAKING DEVICE FOR BRAKING A SUPPORT MEMBER AND SUPPORTING DEVICE FOR SUPPORTING THE SUPPORT MEMBER WITH THE SAME

The present application claims priority to Korean Patent Application No. 10-2008-114525 filed on Nov. 18, 2008 and Korean Patent Application No. 10-2009-102886 filed on Oct. 28, 2009, the entire disclosure of which are incorporated herein by reference.

TECHNICAL FIELD

The present disclosure relates to a braking device for braking a support member and a supporting device for supporting the supporting member with the same.

BACKGROUND

An ultrasonic diagnostic apparatus has been widely used as a medical imaging equipment for displaying internal images of a subject and diagnosing the subject.

Generally, the ultrasonic diagnostic apparatus may include the following: a main body for accommodating various components for ultrasonic diagnosis; a display device mounted on the main body for displaying ultrasonic images; and a control panel having a unit for inputting a command and controlling the ultrasonic diagnostic apparatus in order to execute an ultrasonic diagnosis. The control panel may be supported on the main body to move up and down relative to the main body in order to provide the user with convenience during ultrasonic diagnosis.

Figure 1:
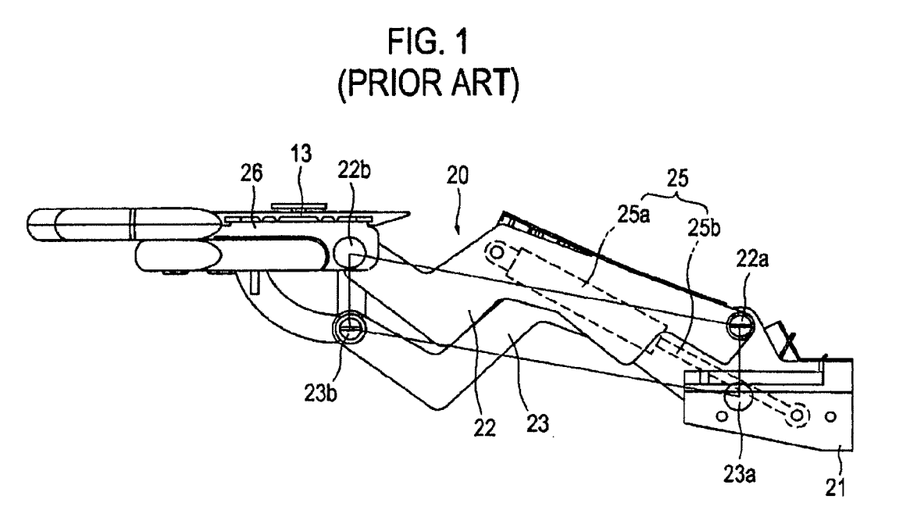
FIG. 1 is a, side elevational view showing a prior art device for supporting a control panel.

FIG. 1 is a side elevational view showing a prior art device for supporting the control panel of an ultrasonic diagnostic apparatus, which is disclosed in U.S. Pat. No. 6,663,569. The device 20 for supporting the control panel 13 may include the following: a base bracket 21 coupled to a main body of an ultrasonic diagnostic apparatus; upper and lower arms 22, 23 pivotably coupled to the base bracket 21 via first and third hinges 22a, 23a, respectively; a support mount 26 pivotably coupled to other ends of the upper and lower arms 22, 23 via second and fourth hinges 22b, 23b to support the control panel 13; and a gas spring 25 coupled to the upper arm 22 and the base bracket 21 at its both ends. The gas spring 25 operates by a valve (not shown), wherein a release switch (not shown) opens and closes the same. The release switch is disposed at the control panel 13. The release switch and the valve are connected by a cable (not shown).

If a user manipulates the release switch, then the valve is open and the working fluid can flow into and out of a cylinder 25a of the gas spring 25. In such a state, the arms 22, 23 are allowed to pivot relative to the base bracket 21 and the control panel 13 can move up and down. If the user manipulates the release switch in order to stay the control panel 13 at a desired height, then the valve is closed and the working fluid cannot flow into and out of the cylinder 25a of the gas spring 25. In this state, the arms 22, 23 are not allowed to move relative to the base bracket 21. Thus, the control panel 13 may stay at such desired height.

However, the above-described prior art device 20 for supporting the control panel must include the gas spring 25 disposed between the arm 22 and the base bracket 21 for selectively restricting the pivotal movement of the arms 22, 23. In addition, it must include the release switch and the cable for actuating the gas spring 25. Thus, there is a problem in that a design of the ultrasonic diagnostic apparatus would be somewhat restricted due to the arrangement of the gas spring 25, the release switch and the cable. Further, a long-term use of the gas spring 25 tends to wear out the cylinder 25a and a rod 25b, thereby significantly deteriorating the braking force of the gas spring 25. Moreover, there is another problem in that a user must move the control panel 13 against the resistant pressure of the working fluid of the gas spring 25.

SUMMARY

Various embodiments of a braking device for braking a support member are provided. The support member connects a main body of an equipment at one end thereof and a sub-body of the equipment at an opposite end thereof. In one embodiment of the present disclosure, by way of non-limiting example, the braking device may comprise the following: a support bracket mounted on the main body of the equipment; a shaft connected at both ends of the support bracket; a plurality of first plates disposed around the shaft, which passes through the plurality of first plates, the plurality of first plates being movable up and down by a pivotal movement of the support member at the one end of the support member, a plurality of second plates disposed around the shaft, which passes through the plurality of second plates, each of the plurality of second plates being alternately positioned between the plurality of first plates; and a pressing unit movable along the shaft between a braked position (when the pressing unit presses the first and second plates to bring said plates into contact) and an unbraked position (when the first and second plates are spaced apart).

The first plate may define a guide slit therethrough, while the shaft may pass through the guide slit.

The pressing unit may comprise: a pressing member positioned adjacent to the first and second plates, the shaft passing through the pressing member; and a movable member coupled to the pressing member for moving the pressing member between the braked position and the unbraked position.

The braking device may further comprise a biasing member for biasing the pressing member toward the braked position. The biasing member may include a compressive spring disposed between the support bracket and the pressing member.

Various embodiments of a supporting device for supporting a sub-body of an equipment relative to a main body of the equipment are provided. In another embodiment of the present disclosure, the supporting device may comprise the following: a base bracket mounted on the main body of the equipment; a support member connecting the main body of the equipment at one end thereof and the sub-body of the equipment at an opposite end thereof, the support member including a plurality of first plates disposed at the one end to be movable up and down by a pivotal movement of the one end, each of the first plates having a guide slit therethrough; a support bracket mounted on the base bracket; a shaft having a plurality of second plates alternately disposed between the first plates, the shaft being connected at both ends of the support bracket and passing through the guide slits of the first plates; a pressing member movable along the shaft between a braked position (when the pressing member presses the first and second plates to bring said plates into contact) and an unbraked position (when the first and second plates are spaced apart); a biasing member for biasing the pressing member toward the braked position; and a movable member coupled to the pressing member for moving the pressing member between the braked position and the unbraked position.

In one embodiment of the present disclosure, the movable member may comprise: a spindle having a screw thread on a periphery thereof; and a movable bracket having a threaded aperture adapted to screw-engage the periphery of the spindle. The movable bracket is movable along the shaft by a rotation of the spindle.

The devices may further comprise: an electric motor for generating a driving power for rotating the spindle, the electric motor having a driving gear; and a gear train for connecting the driving gear to a driven gear disposed on the spindle.

The driving gear may include a worm gear, while the gear train includes a worm wheel gear meshing with the worm gear.

In one embodiment of the present disclosure, the movable bracket may further comprise a cam element rotatably mounted thereon and having a cam surface. The cam surface may be in contact with a contact member disposed on the main body of the equipment. The pressing member may be movable between the braked position and the unbraked position by a rotation of the cam element relative to the contact member.

In one embodiment of the present disclosure, the electric motor may be energized by an uninterrupted power supply.

The Summary is provided to introduce a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

Arrangements and embodiments may be described in detail with reference to the following drawings in which like reference numerals refer to like elements and wherein.

DETAILED DESCRIPTION

A detailed description may be provided with reference to the accompanying drawings. One of ordinary skill in the art may realize that the following description is illustrative only and is not in any way limiting. Other illustrative embodiments may readily suggest themselves to such skilled persons having the benefit of this disclosure.

Figure 2:
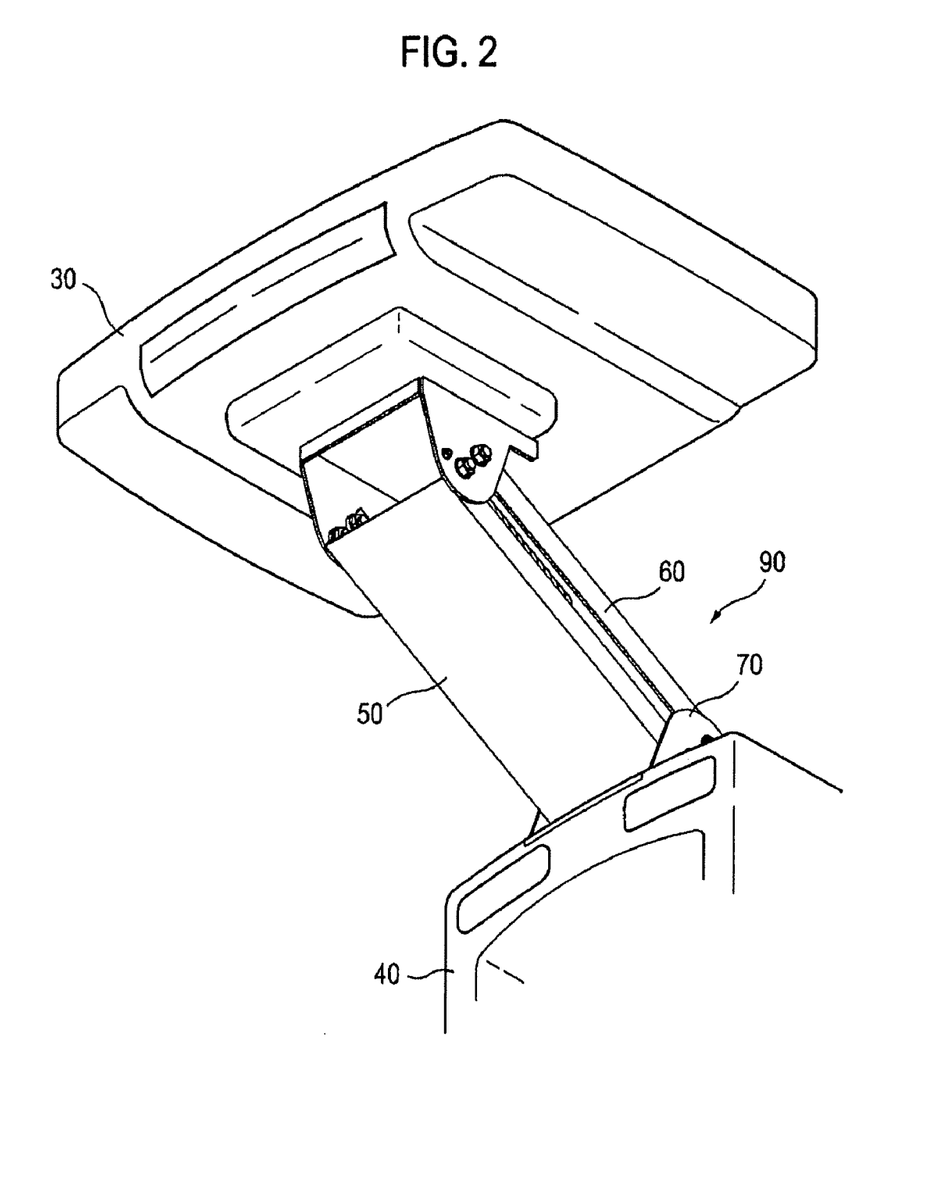
FIG. 2 is a perspective view showing a braking supporting device for supporting a sub-body of an equipment according to the present disclosure.

FIG. 2 is a perspective view showing a supporting device for supporting a sub-body of an equipment according to the present disclosure. In various embodiments, the equipment may include a medical imaging equipment, and more particularly an ultrasonic diagnosis apparatus. Further, the sub-body of the equipment may include a control panel of the medical imaging equipment. The supporting device 90 for supporting the control panel of a medical imaging equipment may comprise: a base bracket 70 mounted to a main body 40 of a medical imaging equipment (not shown); and support members 50, 60 disposed between the base bracket 70 and a control panel 30. The support members 50, 60 may be pivotably coupled to the base bracket 70 at one ends thereof and pivotably support the control panel 30 at opposite ends thereof. The control panel 30 may be movable up and down relative to the main body 40 by pivotal movement of the support members 50, 60. A device 100 for braking a support member for a control panel (hereinafter referred to as "braking device") may be installed near the base bracket 70 of the main body 40. The braking device 100 may restrict the pivotal movement of the support members 50, 60 relative to the main body 40 to lock the control panel 30 at a desired position. In one embodiment, the support members 50, 60 may comprise a first support member 50 and a second support member 60. The first and second support members 50, 60 may pivot relative to the main body 40 while maintaining a parallel state relative to each other. In other embodiment, the supporting device 90 may have only one support member.

Figure 3:
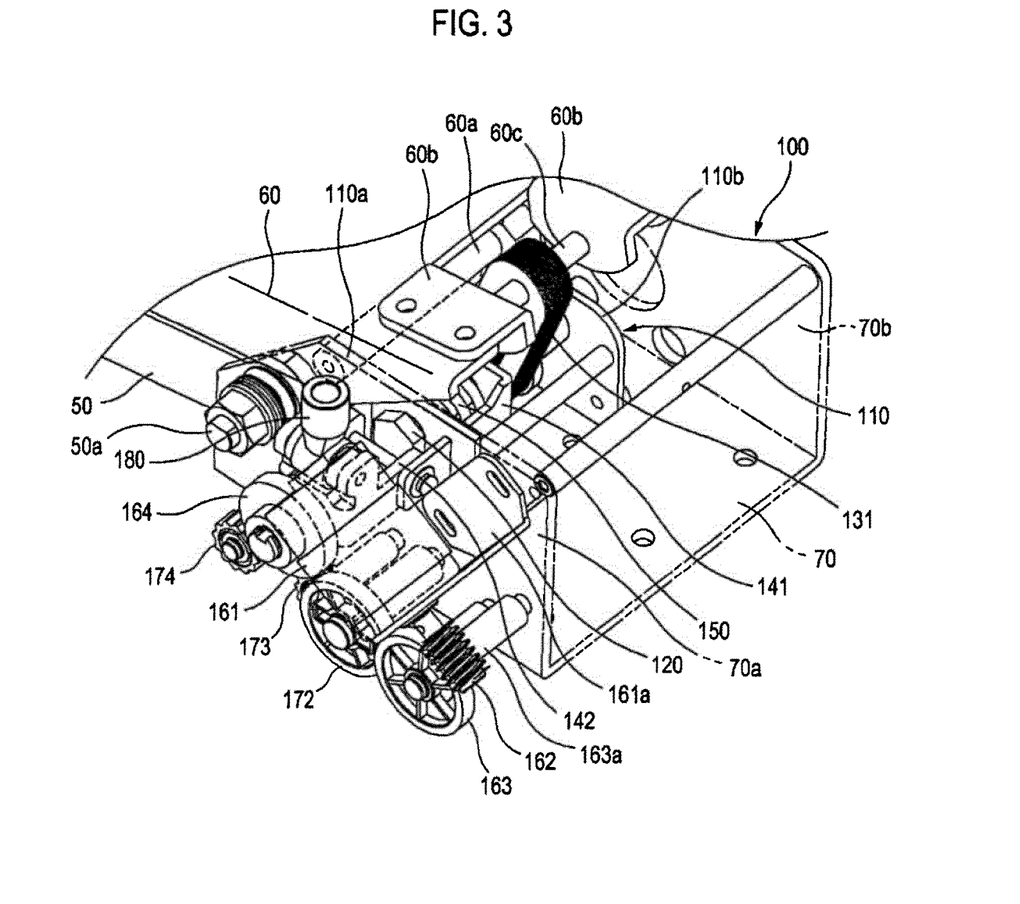
FIG. 3 is a perspective view showing a braking device according to the present disclosure.
Figure 4:
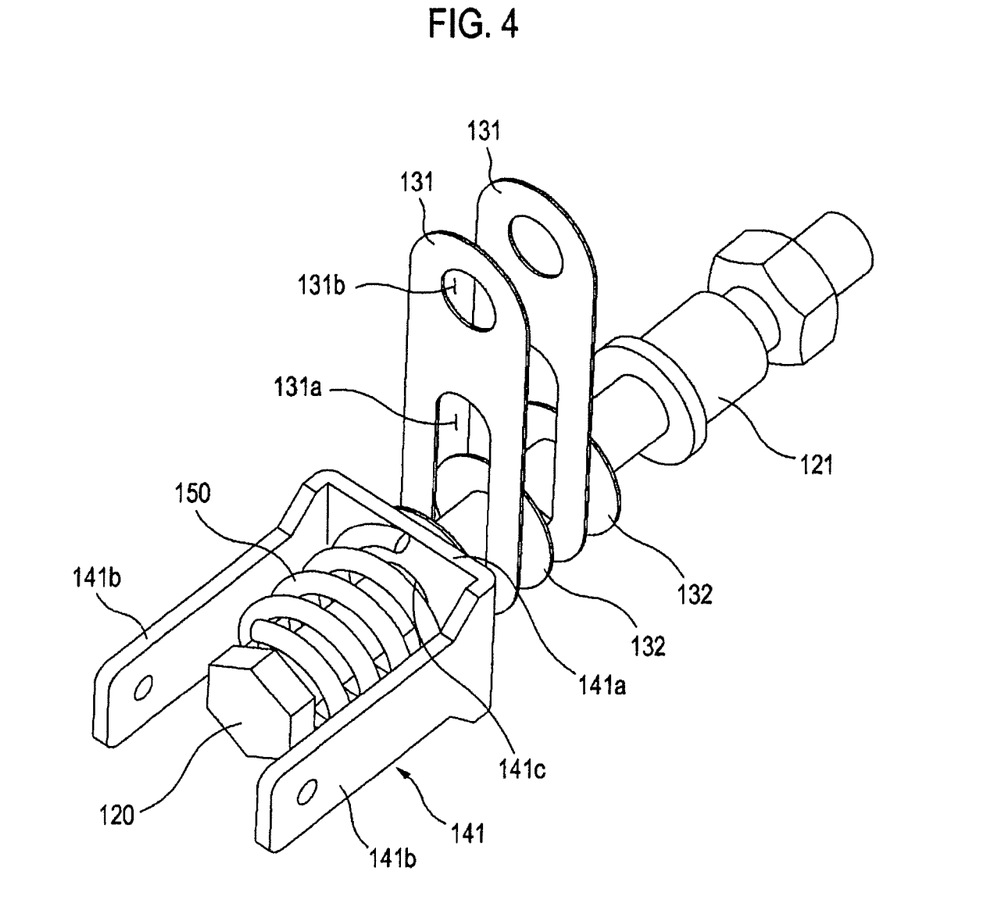
FIG. 4 is an enlarged perspective view showing first and second plates of the braking device shown in FIG. 3.

FIG. 3 is a perspective view showing the braking device according to the present disclosure. FIG. 4 is an enlarged perspective view showing first and second plates of the braking device shown in FIG. 3.

Referring to FIGS. 3 and 4, the braking device 100 according to one embodiment of the present disclosure may comprise the following: a support bracket 110; a shaft 120; a plurality of first plates 131; a plurality of second plates 132; a pressing unit (not shown); and a biasing member 150.

The support bracket 110 may be mounted on the main body 40 of the medical imaging equipment. The shaft 120 may be disposed at the support bracket 110 and has a stopper 121 provided on a periphery thereof. The first plates 131 may be situated between the second support member 60 and the shaft 120. At least a portion of each of the first plates 131 may be positioned around the shaft 120, which may pass through the first plates 131. The first plates 131 move up and down relative to the shaft 120 by the pivotal movement of the support members 50, 60. The second plates 132 are mounted around the shaft 120 and alternately arranged between the first plates 131 along a length direction of the shaft 120. The pressing unit may comprise a pressing member 141 and a movable member 160. The pressing member 141, through which the shaft 120 passes, may be positioned adjacent to the first and second plates 131, 132. Also, the pressing member 141 may be disposed at the support bracket 110 and movable along the length direction of the shaft 120 between a braked position and an unbraked position. The movable member 160 may be coupled to the pressing member 141 to move the pressing member 141 between the braked position and the unbraked position. The biasing member 150 may bias the pressing member 141 toward the braked position. The biasing member 150 may include a compressive spring disposed between the support bracket 110 and the pressing member 141 while winding around the shaft 120. The braked position may be a position where the first plates 131 and the second plates 132 may be brought into surface contact with one another by pressing the first and second plates 131, 132 against the stopper 121. The unbraked position may be a position where the first and second plates 131, 132 may be spaced apart from one another along the length direction of the shaft 120.

By way of an example, the base bracket 70 and the support bracket 110 may be fabricated by bending a metallic plate. The base bracket 70 and the support bracket 110 may have bent portions 70a, 70b and 110a, 110b, respectively. In this embodiment, the base bracket 70 may be mounted on the main body 40 of the medical imaging equipment. Further, the support bracket 110 may be mounted on the base bracket 70 such that the bent portions 70a, 70b and 110a, 110b may be parallel to each other.

Both ends of the shaft 120 may be positioned at the bent portions 110a, 110b of the support bracket 110, respectively. As shown in FIG. 4, the stopper 121 may be provided on the periphery of the shaft 120. Alternatively, the stopper 121 may be separately provided and coupled to the shaft 120 in a fit engagement manner. The shaft 120 may pass through the biasing member 150, the pressing member 141, and the first and second plates 131, 132 one after another.

The pressing member 141 may be movable along the length direction of the shaft 120. As shown in FIG. 4, the pressing member 141 may have a pressing surface 141a in surface contact with the first plate 131 or the second plate 132, as well as legs 141b perpendicularly extending from both ends of the pressing surface 141a. The legs 141b of the pressing member 141 may be disposed to penetrate through the bent portion 110a of the support bracket 110. As the pressing member 141 may move between the braked position and the unbraked position, the legs 141b of the pressing member 141 may slide as passing through the bent portion 110a of the support bracket 110. The movement of the pressing member 141 may position the first plates 131 and the second plates 132 at the braked position and the unbraked position.

As shown in FIG. 3, the first and second support members 50, 60 of the supporting device 90 may be pivotally coupled to the base bracket 70 via pivot shafts 50a, 60a, respectively. Also, the second support member 60 may be connected to the support bracket 110 via the first plates 131. Fixed brackets 60b may be attached to the other end of the second support member 60, while a support shaft 60c may be coupled to the fixed brackets 60b. The first plate 131 may have a guide slit 131a and a through-hole 131b. The first plates 131 may be pivotally coupled to the shaft 120 via the guide slit 131a and to the support shaft 60c via the through-hole 131b. Further, the first plate 131 may be movable within a length of the guide slit 131a relative to the shaft 120. As the control panel 30 may move up or down, the second support member 60 may pivot about the pivot shaft 60a relative to the base bracket 70. Along with the pivotal movement of the second support member 60, the support shaft 60c may pivot counter to the one end of the second support member 60. The length of the guide slit 131a may be appropriately determined according to a pivoting range of the support shaft 60c.

As shown in FIG. 4, the first and second plates 131, 132 may be alternately arranged (in FIG. 4, only two first plates and two second plates are shown for ease of illustration). That is, the second plate 132 may be interposed between two neighboring first plates 131. The second plates 132 may be ring-shaped such that they are movable along the length direction of the shaft 120.

An aperture 141c, through which the shaft 120 passes, may be defined through the pressing surface 141a of the pressing member 141. The stopper 121 may be situated next to the farthest one of the first and second plates 131, 132 from the pressing surface 141a. The biasing member 150 may be interposed between the pressing surface 141a and the bent portion 110b of the support bracket 110 as slightly compressed. Thus, the pressing member 141 may bias the first and second plates 131, 132 toward the stopper 121 under a restoring force of the biasing member 150. The first plates 131 may be allowed to be in surface contact with the second plates 132 between the pressing surface 141a and the stopper 121. For example, a right side of one of the first plates 131 may contact a left side of one of the second plates 132, while a left side of the one of the first plates 131 may contact a right side of the opposite one of the second plates 132. When the first plates 131 and the second plates 132 are in close contact with one another (i.e., braked position), the first plates 131 may not be allowed to move relative to the second plates 132 due to friction forces occurring therebetween. Thus, the second support member 60 cannot also pivot relative to the base bracket 70 in the braked position. If the pressing member 141 may move away from the stopper 121 against the restoring force of the biasing member 150 (i.e., unbraked position), then the first and second plates 131, 132 may be spaced apart from one another. As such, the first plates 131 can move relative to the second plates 132. Thus, the second support member 60 can pivot relative to the base bracket 70 in the unbraked position. An elastic modulus of the biasing member 150 may be determined based on the number of first and second plates 131, 132 so as not to allow the first plates 131 to move relative to the second plates 132 in the braked position.

Figure 5:
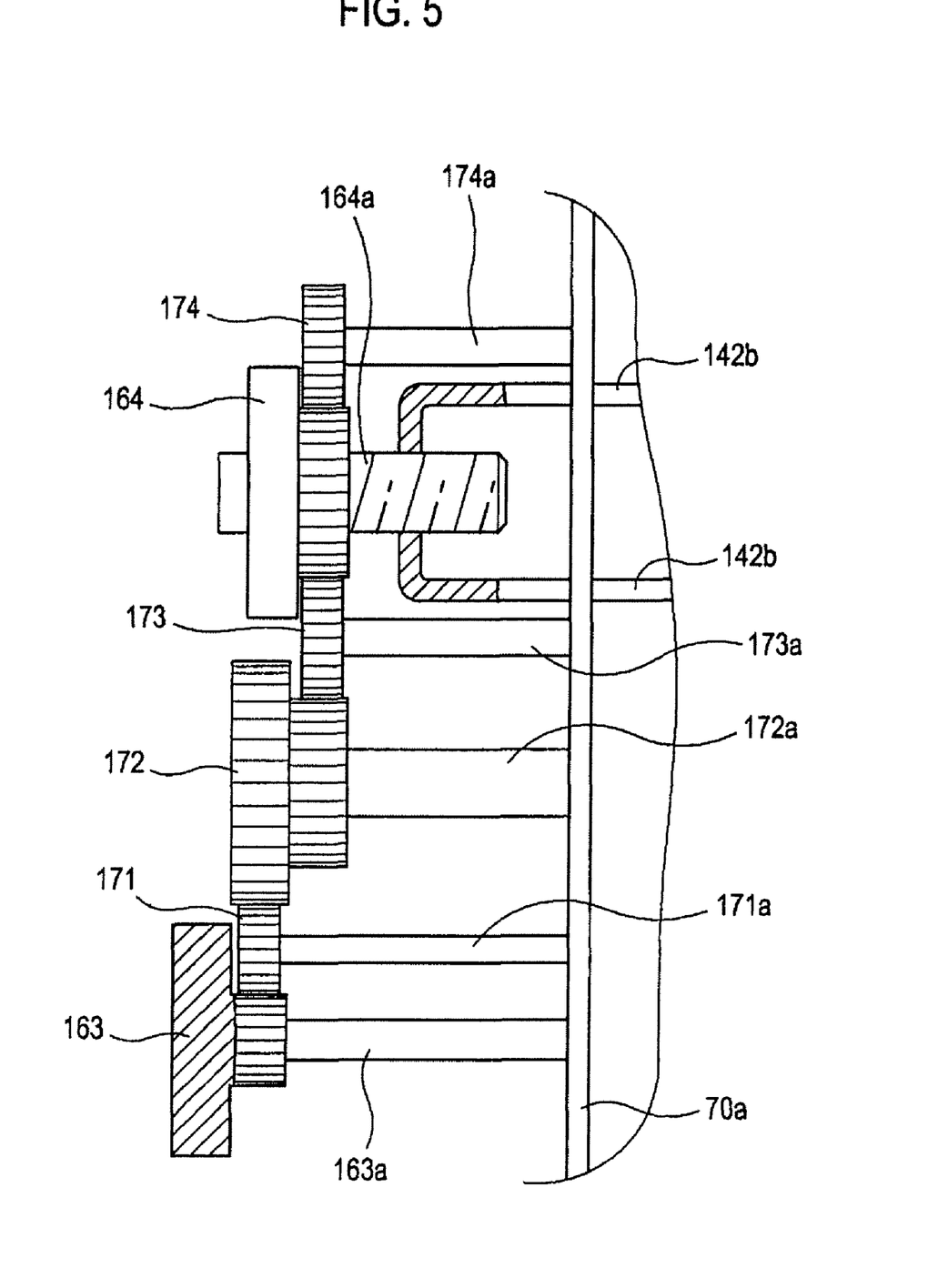
FIG. 5 is a plan view schematically showing a gear train used in the braking device shown in FIG. 3.
Figure 6:
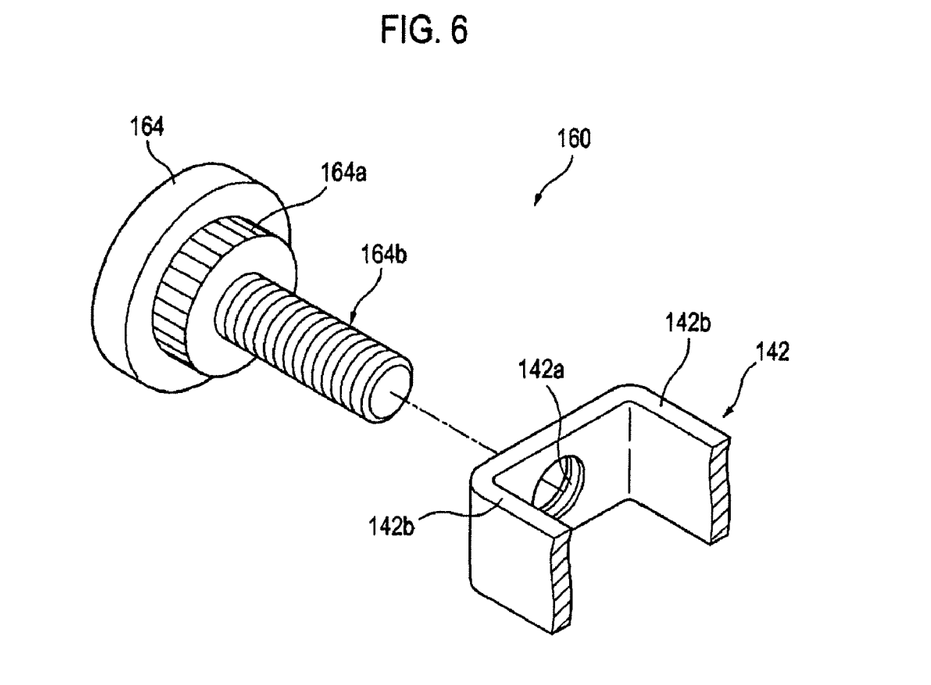
FIG. 6 is an exploded perspective view showing a movable member comprising a spindle and a movable bracket of the braking device shown in FIG. 3.
Figure 7:
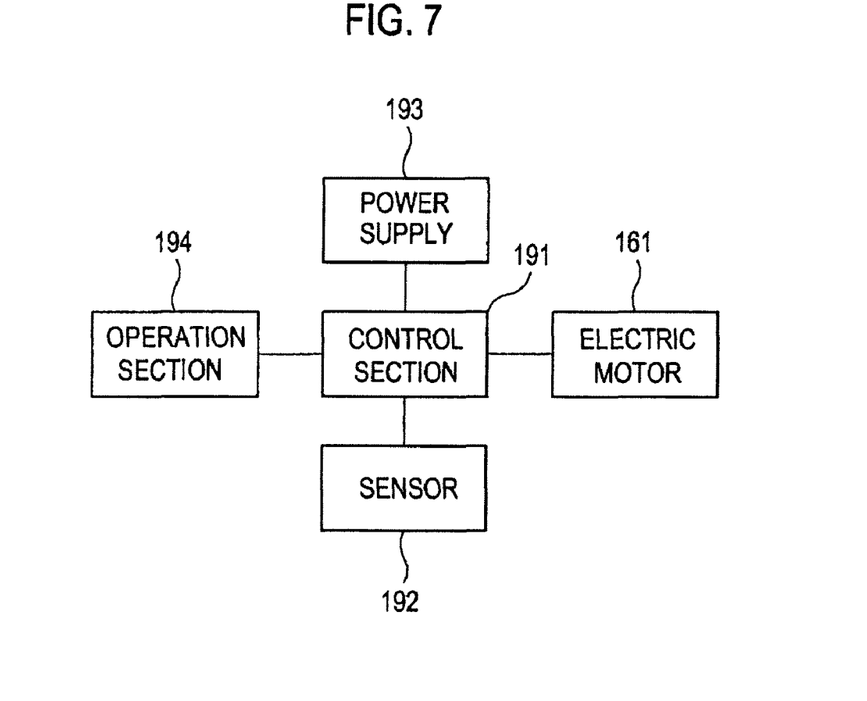
FIG. 7 is a block diagram showing a constitution of an electric mode of the braking device shown in FIG. 3.

FIG. 5 is a plan view schematically showing a gear train employed in the braking device shown in FIG. 3. FIG. 6 is an exploded perspective view showing a movable member comprising a spindle and a movable bracket of the braking device shown in FIG. 3. FIG. 7 is a block diagram showing a constitution of an electric operation mode of the braking device shown in FIG. 3.

As shown in FIGS. 5 and 6, the movable member 160 may comprise a spindle 164 and a movable bracket 142. The spindle 164 may have a driven gear 164a and a driving shaft 164b extending from the driven gear 164a with a screw thread formed on a periphery thereof. The movable bracket 142 may have a threaded aperture 142a screw-engaging the driving shaft 164b and legs 142b penetrating through the bent portion 70a of the base bracket 70. The legs 142b of the movable bracket 142 may be coupled to the legs 141b of the pressing member 141 by means of a hinge. As the spindle 164 rotates, the movable bracket 142 may move along the length direction of the shaft 120 by a screw-movement between the driving shaft 164b and the threaded aperture 142a.

The braking device 100 may further comprise a device for driving the spindle 164. The driving device may include an electric motor 161 and a gear train 170 for increasing and transmitting a driving power from a driving gear coupled to a rotating shaft of the motor 161 to the driven gear 164a of the spindle 164. The electric motor 161 may be coupled to the bent portion 70a of the base bracket 70 via a fixing bracket 161a. In the illustrated embodiment, the rotating shaft of the electric motor 161 may be oriented perpendicular to the rotating shaft of the spindle 164. The driving gear may include a worm gear 162, while the gear train 170 may include a worm wheel gear 163 engaged to the worm gear 162.

The worm gear 162 and the worm wheel gear 163 may increase the driving power caused by the electric motor 161, while decreasing a revolution speed of the electric motor 161. The gear train 170 may be disposed between the worm wheel gear 163 and the spindle 164. The gear train 170 may have a first gear 171, a second gear 172, a third gear 173 and a fourth gear 174. The worm wheel gear 163 may rotate about a rotating shaft 163a of the worm wheel gear coupled to the bent portion 70a of the base bracket 70. The first to fourth gears 171, 172, 173, 174 may rotate about first to fourth rotating shafts 171a, 172a, 173a, 174a, which may be coupled to the bent portion 70a of the base bracket 70, respectively. As shown in FIG. 5, the worm wheel gear 163 may comprise a two-stepped gear with a portion meshing with the worm gear 162 and a portion meshing with the first gear 171. The second gear 172 may mesh with the first gear 171 to decrease the revolution speed of the electric motor 161. The second gear 172 may include a two-stepped gear with a portion meshing with the first gear 171 and a portion meshing with the third gear 173. The driven gear 164a of the spindle 164 may mesh with the third and fourth gears 173, 174. The third gear 173 may serve to transmit the driving power from the second gear 172 to the spindle 164 and to support the rotation of the spindle 164 together with the fourth gear 174. The third and fourth gears 173, 174 can prevent the spindle 164 from moving toward the bent portion 70a of the base bracket 70 due to movement between the driving shaft 164b and the threaded aperture 142a.

The movable bracket 142 may be coupled to the pressing member 141 to move along the length direction of the shaft 120 together with the pressing member 141. The spindle 164 and the movable bracket 142 can move toward or away from each other by the screw-movement therebetween. Thus, if any one of the spindle 164 and the movable bracket 142 becomes fixed, then the other can move along the length direction of the shaft 120. In this embodiment, since the spindle 164 may rotate without any linear movement, the movable bracket 142 may be allowed to move along the length direction of the shaft 120.

In order to move the pressing member 141 in an electric operation manner, the braking device 100 of the present disclosure may further comprise: a power supply 193; an operation section 194 for generating a signal for the actuation and rotating direction of the electric motor 161; a control section 191 for controlling the actuation and the rotating direction of the electric motor 161; and a sensor 192 for detecting a movement amount of the pressing member 141 or the movable bracket 142. Referring to FIG. 7, the control section 191 may be configured to drive the electric motor 161 in response to the signal of the operation section 194 and stop the electric motor 161 based on a signal detected from the sensor 192. The operation section 194 may include buttons for braking and unbraking. For example, the buttons may be provided on the control panel 30 or any other suitable location in the medical imaging equipment. The sensor 192, which may be provided to the base bracket 70 or the support bracket 110, may include any sensor suitable for detecting the movement amount of the pressing member 141 or the movable bracket 142.

The medical imaging equipment of the present disclosure may include an uninterrupted power supply (UPS). The UPS may be an electrical power supply, which can supply an electrical power when the main power supply fails. The electric motor 161 may be energized by the UPS. Thus, a user can operate the braking device 100 in the electric operation mode irrespective of electricity failure.

When the first and second plates 131, 132 are in the braked position, the braking device 100 of the present disclosure may be operated in the electric mode as described below.

If a user operates the operation section 194 for adjusting a height of the control panel 30, then the electric motor 161 may be driven in one direction to rotate the spindle 164. Also, the gear train 170 disposed between the worm wheel gear 163 and the spindle 164 may increase the driving power of the electric motor 161 and decrease the revolution speed of the electric motor 161. The pressing member 141 and the movable bracket 142 may move along the length direction of the shaft 120 away from the stopper 121 by the rotation of the spindle 164, thereby spacing the first and second plates 131, 132 apart from one another. If it may be detected by the sensor 192 that the pressing member 141 and the movable bracket 142 reach a predetermined position, then the control section 191 may stop the electric motor 161. As a result, the first and second plates 131, 132 may form the unbraked position. In such a case, since the second support member 60 may be permitted to move up and down relative to the base bracket 70, the user can adjust the height of the control panel 30.

If the user may operate the operation section 194 for fixing the control panel 30 at a desired height, then the electric motor 161 may be driven in a direction opposite to said one direction to rotate the spindle 164. Also, the gear train 170 disposed between the worm wheel gear 163 and the spindle 164 may increase the driving power of the electric motor 161 and decrease the revolution speed of the electric motor 161. Then, both the pressing member 141 and the movable bracket 142 may move along the length direction of the shaft 120 toward the stopper 121 by the counter rotation of the spindle 164, thereby closely contacting the first and second plates 131, 132 to one another. If it may be detected by the sensor 192 whether the pressing member 141 and the movable bracket 142 reach a predetermined position, then the control section 191 may stop the electric motor 161. As a result, the first and second plates 131, 132 may form the braked position. Thus, the second support member 60 may be locked and not be allowed to move up and down relative to the base bracket 70.

Figure 8:
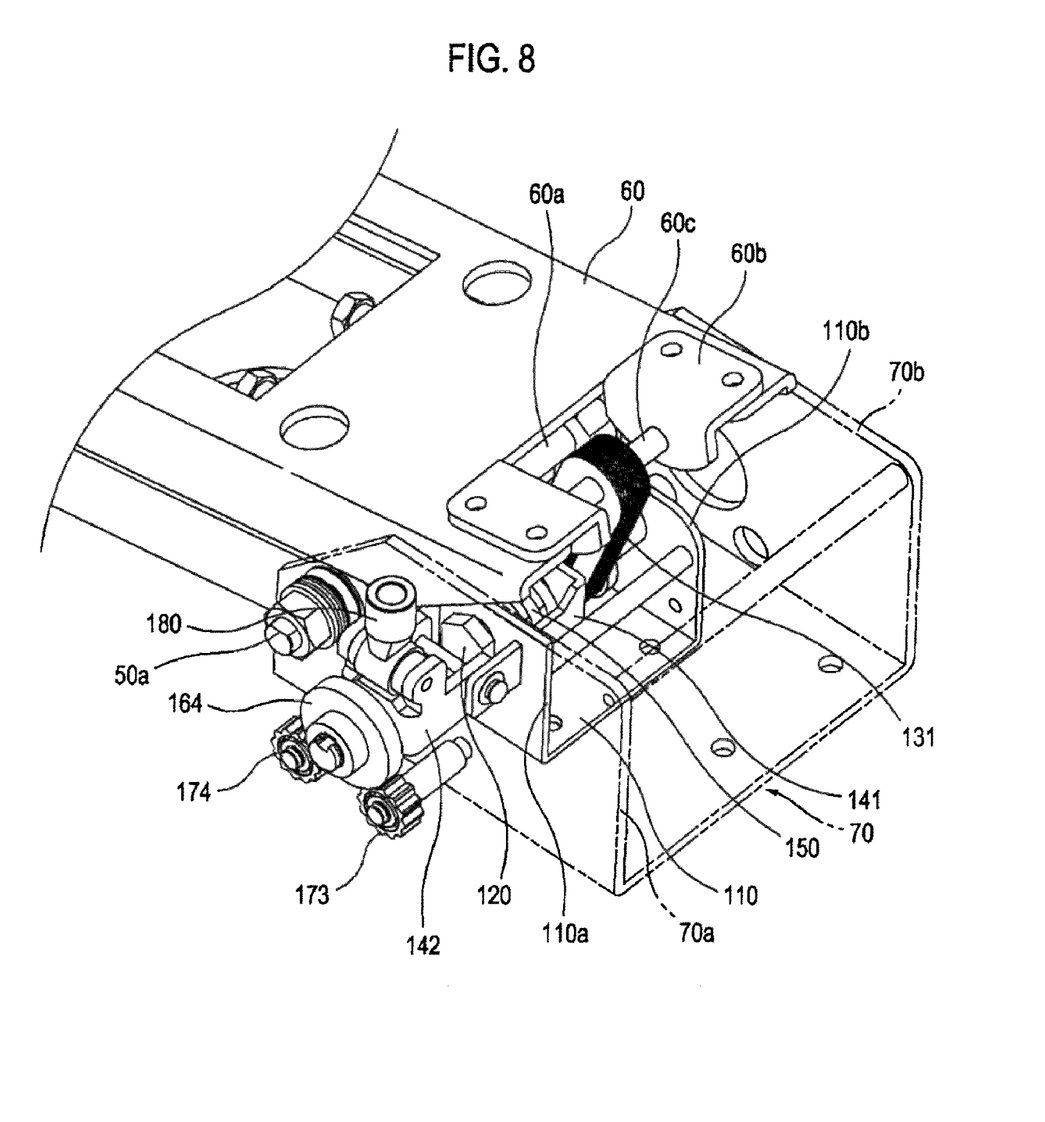
FIG. 8 is a perspective view showing when the braking device shown in FIG. 3 is in the unbraked position in a manual mode.
Figure 9:
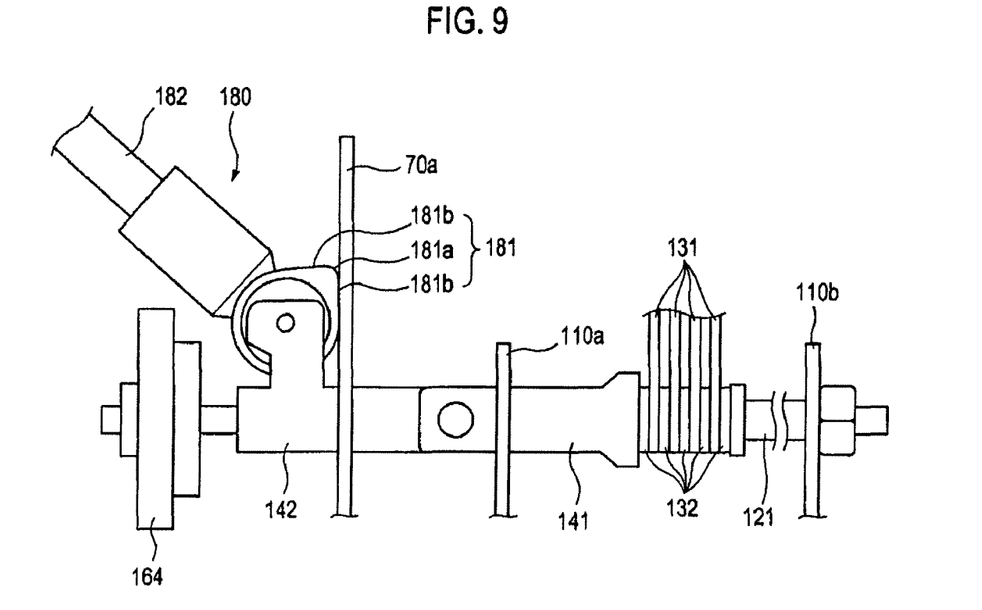
FIG. 9 shows when the braking device shown in FIG. 3 is in the braked position in the manual mode.
Figure 10:
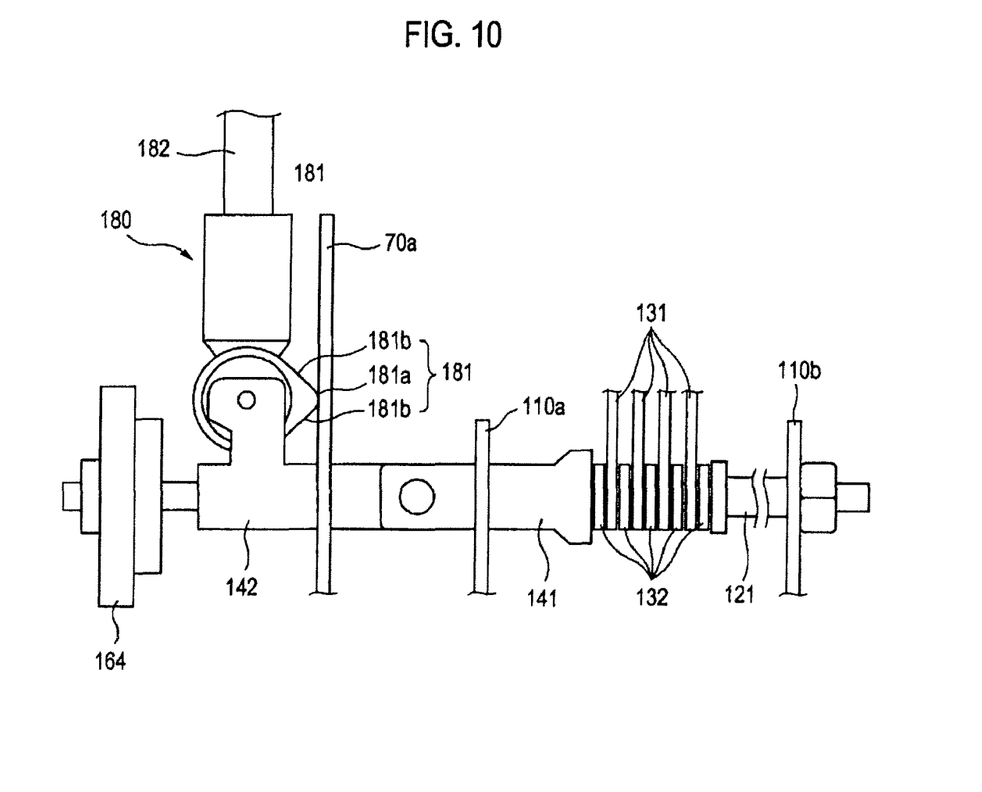
FIG. 10 shows when the braking device shown in FIG. 3 is in the unbraked position in the manual mode.

FIG. 8 is a perspective view showing that the braking device shown in FIG. 3 is in the unbraked position in a manual operation mode. FIGS. 9 and 10 schematically show that the braking device shown in FIG. 3 is in the braked and unbraked positions in the manual operation mode, respectively.

The movable bracket 142 may further include a cam element 180 that may be mounted on the legs 142b and has a cam surface 181. The braking device 100 may further include a contact member that may contact the cam surface 181 to serve as a fulcrum for the movement of the movable bracket 142. The contact member may be disposed at the support bracket 110 or the base bracket 70. In this embodiment, the contact member may be the bent portion 70a of the base bracket 70 through which the legs 142b of the movable bracket 142 pass. As the cam element 180 rotates in one direction, the cam surface 181 may contact one side of the bent portion 70a to thereby move or pull out the pressing member 141 from the stopper 121.

The cam element 180 may be rotatably coupled to the movable bracket 142. In this embodiment, the cam element 180 may include a circular disk cam or a tangent cam. Further, the cam surface 181 may include a convex surface provided on a periphery of the circular disk cam or the tangent cam. Specifically, the cam surface 181 may comprise a summit portion 181a and slope portions 181b. As the cam element 180 may rotate with respect to the bent portion 70a, the summit portion 181a and the slope portions 181b of the cam element 180 may contact the one surface of the bent portion 70a. For example, when the first and second plates 131, 132 are in the unbraked position, the summit portion 181a of the cam surface 181 may be in contact with the one side of the bent portion 70a. When the first and second plates 131, 132 are in the braked position, the slope portion 181b of the cam surface 181 may be in contact with the one surface of the bent portion 70a. The braking device 100 may further include a lever 182 coupled to the cam element 180 for facilitating the rotation of the cam element 180. A position of the lever 182 may vary depending on the configuration of the cam element 180 and the cam surface 181.

The braking device 100 of the present disclosure may operate in the manual mode as described below.

If the cam element 180 rotates with respect to the bent portion 70a of the base bracket 70 (e.g., from the braked position to the unbraked position) to adjust the height of the control panel 30, then the summit portion 181a of the cam surface 181 may contact the one side of the bent portion 70a. The reaction between the cam surface 181 and the bent portion 70a may then cause the pressing member 141 and the movable bracket 142 to move along the length direction of the shaft 120 away from the stopper 121 while compressing the biasing member 150, thereby spacing the first and second plates 131, 132 apart from one another. As a result, the first and second plates 131, 132 may form the unbraked position (see FIG. 10). Thus, the second support member 60 may be allowed to move relative to the base bracket 70 up and down, and the user can adjust the height of the control panel 30.

If the cam element 180 rotates with respect to the bent portion 70a of the base bracket 70 (e.g., from, the unbraked position to the braked position) to fix the control panel 30 at a desired height, then the slope portion 181b of the cam surface 181 may contact the one side of the bent portion 70a. The restoring force of the biasing member 150 may then cause the pressing member 141 and the movable bracket 142 to move along the length direction of the shaft 120 toward the stopper 121, thereby bringing the first and second plates 131, 132 into surface contact with one another. As a result, the first and second plates 131, 132 may form the braked position (see FIG. 9). Thus, the second support member 60 may not be allowed to move relative to the base bracket 70 up and down. As such, the control panel 30 may be locked at the desired height.

According to the braking device 100 for the support members of the control panel 30, the pivotal movement of the support members 50, 60 can strongly brake under the surface contact between the first and second plates 131, 132. Further, a braking force can be easily increased and decreased by varying the number of the first and second plates 131, 132. Furthermore, the first and second plates 131, 132 participating in the braking operation may be located outside the support members 50, 60, thereby mitigating the restriction on the design of medical imaging equipments. Also, the pressing member 141 may be moved between the braked position and the unbraked position by means of the electric motor or the cam arrangement. Thus, the braking operation can be performed more easily.

Although embodiments have been described with reference to a number of illustrative embodiments thereof, it should be understood that various other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A braking device for braking a support member, which connects a main body of an equipment at one end thereof and a sub-body of the equipment at an opposite end thereof, comprising:
   a support bracket mounted on the main body of the equipment;
   a shaft connected at both ends of the support bracket;
   a plurality of first plates disposed around the shaft, which passes through the first plates, the first plates being movable up and down by a pivotal movement of the support member at the one end of the support member;
   a plurality of second plates disposed around the shaft, which passes through the second plates, each of the second plates being alternately positioned between the first plates; and
   a pressing unit movable along the shaft between:
   a braked position when the pressing unit presses the first and second plates to bring the first and second plates into contact with one another; and
   an unbraked position when the first and second plates are spaced apart from one another, wherein the pressing unit comprises:
   a pressing member positioned adjacent to the first and second plates, the shaft passing through the pressing member; and
   a movable member coupled to the pressing member for moving the pressing member between the braked position and the unbraked position.

2. The braking device of claim 1, wherein the first plates define a guide slit therethrough, the shaft passing through the guide slit.

3. The braking device of claim 1, wherein the movable member comprises:
   a spindle having a screw thread on a periphery thereof; and
   a movable bracket having a threaded aperture for screw-engaging the periphery of the spindle, the movable bracket being movable along the shaft by a rotation of the spindle.

4. The braking device of claim 3, further comprising:
   an electric motor for generating a driving power for rotating the spindle, the electric motor having a driving gear; and
   a gear train for connecting the driving gear to a driven gear disposed on the spindle.

5. The braking device of claim 4, wherein the driving gear includes a worm gear and the gear train includes a worm wheel gear meshed with the worm gear.

6. The braking device of claim 3, further comprising a biasing member for biasing the pressing member towards the braked position.

7. The braking device of claim 6, wherein the biasing member includes a compressive spring disposed between the support bracket and the pressing member.

8. The braking device of claim 6,
   wherein the movable bracket further comprises a cam element rotatably mounted thereon and having a cam surface, the cam surface being in contact with a contact member disposed on the main body of the equipment, and
   wherein the pressing member is movable between the braked position and the unbraked position by a rotation, of the cam element relative to the contact member.

9. A supporting device for supporting a sub-body of an equipment relative to a main body of the equipment, comprising:
   a base bracket mounted on the main body of the equipment;
   a support member connecting the main body of the equipment at one end thereof and the sub-body of the equipment at an opposite end thereof, the support member including a plurality of first plates disposed at the one end to be movable up and down by a pivotal movement of the one end, each of the first plates having a guide slit therethrough;
   a support bracket mounted on the base bracket;

a shaft having a plurality of second plates alternately disposed between the first plates, the shaft being connected at both ends of the support bracket and passing through the guide slits of the first plates;

a pressing member movable along the shaft between:
- a braked position when the pressing member presses the first and second plates to bring the first and second plates into contact with one another; and
- an unbraked position when the first and second plates are spaced apart from one another;

a biasing member for biasing the pressing member towards the braked position; and a movable member coupled to the pressing member for moving the pressing member between the braked position and the unbraked position.

10. The supporting device of claim 9, wherein the movable member comprises:
- a spindle having a screw thread on a periphery thereof; and
- a movable bracket having a threaded aperture for screw-engaging the periphery of the spindle, the movable bracket being movable along the shaft by a rotation of the spindle.

11. The supporting device of claim 10, further comprising:
- an electric motor for generating a driving power for rotating the spindle, the electric motor having a driving gear; and
- a gear train for connecting the driving gear to a driven gear disposed on the spindle.

12. The supporting device of claim 11, wherein the electric motor is energized by an uninterrupted power supply.

13. The supporting device of claim 11, wherein the driving gear includes a worm gear and the gear train includes a worm wheel gear meshed with the worm gear.

14. The supporting device of claim 10,
wherein the movable bracket further comprises a cam element rotatably mounted thereon and having a cam surface, the cam surface being in contact with a contact member disposed on the main body of the equipment, and
wherein the pressing member is movable between the braked position and the unbraked position by a rotation of the cam element relative to the contact member.

* * * * *